United States Patent
Holtzman et al.

(10) Patent No.: US 7,418,344 B2
(45) Date of Patent: Aug. 26, 2008

(54) REMOVABLE COMPUTER WITH MASS STORAGE

(75) Inventors: Michael Holtzman, Kfar Vradim (IL); Yosi Pinto, Kfar-Vradim (IL)

(73) Assignee: SanDisk Corporation, Milpitas, CA (US)

( * ) Notice: Subject to any disclaimer, the term of this patent is extended or adjusted under 35 U.S.C. 154(b) by 370 days.

(21) Appl. No.: 09/924,185

(22) Filed: Aug. 2, 2001

(65) Prior Publication Data

US 2003/0028699 A1    Feb. 6, 2003

(51) Int. Cl.
G06F 13/00 (2006.01)
G06F 13/14 (2006.01)
G06F 3/00 (2006.01)
G06F 5/00 (2006.01)
G06F 13/12 (2006.01)
G06F 13/38 (2006.01)
H05K 7/10 (2006.01)

(52) U.S. Cl. ............... 701/301; 710/52; 710/65; 710/305

(58) Field of Classification Search ............ 710/1, 710/13, 62, 72, 300–302, 52, 65, 305; 235/380, 235/382; 711/103, 115; 361/737
See application file for complete search history.

(56) References Cited

U.S. PATENT DOCUMENTS

| | | |
|---|---|---|
| 4,851,654 A | 7/1989 | Nitta |
| 4,882,554 A * | 11/1989 | Akaba et al. ............... 333/105 |
| 5,172,338 A | 12/1992 | Mehrotra et al. |
| 5,237,611 A | 8/1993 | Rasmussen et al. |
| 5,388,841 A | 2/1995 | San et al. |
| 5,418,752 A | 5/1995 | Harari et al. |

(Continued)

FOREIGN PATENT DOCUMENTS

DE    298 06 899 U1    7/1998

(Continued)

OTHER PUBLICATIONS

"The Free On-Line Dictionary of Computing." Entry 'stream'. Online Nov. 6, 1996. Retrieved from Internet Jan. 7, 2005. <http://foldoc.doc.ic.ac.uk/foldoc/foldoc.cgi?query=stream>.*

(Continued)

Primary Examiner—Mark Rinehart
Assistant Examiner—Thomas J Cleary
(74) Attorney, Agent, or Firm—Brinks Hofer Gilson & Lione

(57) ABSTRACT

The present invention provides a detachable add-on card unit to a host system that combines mass storage capability and a processor on the same card. The card can receive data from the host, process the data, and store it in processed form, as well as the reverse process of retrieving stored data, processing it, and supplying it to the host. The non-volatile mass storage memory may contain program storage as well as card system data and user data. The end user of the card can program applications into the program storage. The combination of mass storage and a processor also adds to the capabilities of the on-card processor, allowing the card to store and execute programs. The present invention is able to provide a programmable add-on card unit to a host system. A number of applications can be stored in the card's mass storage and loaded as needed by the on-card micro-controller.

21 Claims, 5 Drawing Sheets

U.S. PATENT DOCUMENTS

| | | | |
|---|---|---|---|
| 5,418,837 A | 5/1995 | Johansson et al. | |
| 5,428,787 A | 6/1995 | Pineau | |
| 5,530,232 A * | 6/1996 | Taylor | 235/380 |
| 5,544,356 A * | 8/1996 | Robinson et al. | 707/205 |
| 5,666,516 A | 9/1997 | Combs | |
| 5,737,582 A * | 4/1998 | Fukuzumi | 710/301 |
| 5,850,230 A | 12/1998 | San et al. | |
| 5,877,975 A | 3/1999 | Jigour et al. | |
| 5,923,884 A * | 7/1999 | Peyret et al. | 717/167 |
| 5,969,333 A * | 10/1999 | Barthelemy et al. | 235/492 |
| 5,987,155 A * | 11/1999 | Dunn et al. | 382/116 |
| 5,995,018 A * | 11/1999 | Hane et al. | 340/10.34 |
| 6,005,942 A | 12/1999 | Chan et al. | |
| 6,023,713 A | 2/2000 | Grimsrud et al. | |
| 6,035,380 A | 3/2000 | Shelton et al. | |
| 6,038,320 A | 3/2000 | Miller | |
| 6,038,551 A * | 3/2000 | Barlow et al. | 705/41 |
| 6,047,342 A * | 4/2000 | Depew | 710/301 |
| 6,052,576 A | 4/2000 | Lambourg | |
| 6,055,314 A | 4/2000 | Spies et al. | |
| 6,073,238 A | 6/2000 | Drupsteen | |
| 6,079,019 A * | 6/2000 | Fukuzumi | 713/193 |
| 6,088,761 A * | 7/2000 | Aybay | 711/105 |
| 6,092,202 A | 7/2000 | Veil et al. | |
| 6,097,618 A * | 8/2000 | Jenne | 365/63 |
| 6,108,236 A | 8/2000 | Barnett | |
| 6,191,663 B1 * | 2/2001 | Hannah | 333/17.3 |
| 6,209,077 B1 | 3/2001 | Robertson et al. | |
| 6,266,671 B1 * | 7/2001 | Niimura | 707/100 |
| 6,268,788 B1 | 7/2001 | Gray | |
| 6,298,477 B1 * | 10/2001 | Kessler | 717/145 |
| 6,393,206 B1 | 5/2002 | Yagi et al. | |
| 6,409,089 B1 * | 6/2002 | Eskicioglu | 235/492 |
| 6,532,152 B1 * | 3/2003 | White et al. | 361/62 |
| 6,590,464 B1 * | 7/2003 | Lin et al. | 331/135 |
| 6,961,587 B1 * | 11/2005 | Vilppula et al. | 455/558 |
| 2001/0006195 A1 * | 7/2001 | Sukeda et al. | 235/492 |
| 2001/0037420 A1 | 11/2001 | Sakamoto | |
| 2001/0052038 A1 | 12/2001 | Fallon et al. | |
| 2002/0066792 A1 * | 6/2002 | Guthery et al. | 235/492 |
| 2002/0125328 A1 * | 9/2002 | Sukeda et al. | 235/492 |
| 2002/0195493 A1 * | 12/2002 | Dell | 235/451 |
| 2003/0018587 A1 * | 1/2003 | Althoff et al. | 705/64 |

FOREIGN PATENT DOCUMENTS

| | | |
|---|---|---|
| EP | 0 292 248 A2 * | 11/1988 |
| EP | 0292248 | 11/1988 |
| GB | 2204971 A | 11/1988 |
| WO | WO 93/23809 | 11/1993 |
| WO | WO 01/52727 A1 | 7/2001 |
| WO | WO 02/37794 A1 | 5/2002 |
| WO | WO 93/17388 | 9/2003 |

OTHER PUBLICATIONS

'random-access memory'. The Free On-Line Dictionary of Computing. Dec. 5, 1995. Retrieved from Internet Sep. 22, 2005. <http://foldoc.doc.ic.ac.uk/foldoc/foldoc.cgi?Random+Access+Memory>.*

'Flash Erasable Programmable Read-Only Memory'. The Free On-Line Dictionary of Computing. Apr. 22, 1995. Retrieved from Internet Oct. 3, 2005. <http://foldoc.doc.ic.ac.uk/foldoc/foldoc.cgi?Flash Erasable Programmable Read-Only Memory>.*

'Mass storage'. Wikipedia, the free encyclopedia. Jul. 23, 2005. Retrieved from Internet Sep. 28, 2005. <http://en.wikipedia.org/wiki/Mass_storage>.*

'Flash memory'. Wikipedia, the free encyclopedia. Sep. 23, 2005. Retrieved from Internet Sep. 28, 2005. <http://en.wikipedia.org/wiki/Flash_memory>.*

Drossel, Gary. "Flash-based storage devices replace hard disk drives". Simple Tech. Embedded Control Europe. Nov. 2002.*

'interface' in "The Microsoft Press Computer Dictionary". Second Edition. Microsoft Press. 1994. ISBN 1-55615-597-2. p. 218.*

"MULTOS—a definition from Whatis.com". Webpage. Online May 29, 2001. Retrieved from Internet Sep. 17, 2007. <http://whatis.techtarget.com/definition/0,,sid9_gci555420,00.html>.*

European Patent Office, "Invitation to Pay Additional Fees, Communication Relating to the Results of the Partial International Search", Dec. 11, 2002, 5 pages.

Sean W. Smith et al., "Using a High-Performance, Programmable Secure Coprocessor", Financial Cryptography International Conference, 1998, pp. 1-17.

Martine Lapère et al., "User Authentication in Mobile Telecommunication Environements Using Voice Biometrics and Smartcards", International Conference on Intelligence in Services and Networks, May 27, 1997, pp. 437-443.

"Notification of Transmittal of the International Search Report or the Declaration", International Searching Authority (PCT), Dec. 19, 2002, 4 pages.

Search and Examination Report under Sections 17 and 18(3) for Application No. GB0401853.7 dated Jul. 19, 2005.

Office Action of China State Intellectual Property Office for Application No. 02815148.8 dated Jul. 8, 2005.

Combined Search and Examination Report under Sections 17 and 18(3) for Great Britain Application No. GB0519379.2 for SanDisk Corporation, dated Nov. 2, 2005, 1 page.

First Office Action of China State Intellectual Property Office for Application No. 02815148.8 for SanDisk Corporation, dated Dec. 2, 2005, 8 pages.

"Mass-Storage Device," http://en.wikipedia.org/wiki/Mass-storage_device, Oct. 20, 2006, 1 page.

"Mass-Storage," http://en.wikipedia.org/wiki/Mass_Storage, Oct. 20, 2006, 2 pages.

"Computer Storage," http://en.wikipedia.org/wiki/Computer_Storage, Oct. 20, 2006, 9 pages.

"Digital Cellular Telecommunications System (Phase 2+); Specification of the Subscriber Identity Module—Mobile Equipment (SIM—ME) Interface", Global System for Mobile Communications, GSM 11.11 version 8.3.0 Release 1999, pp. 1-170.

"Identification Cards—Integrated Circuit(s) Cards With Contacts, Part 1: Physical Characteristics", ISO/IEC, 1998, 8 pages.

"Information Technology—Identification Cards—Integrated Circuit(s) Cards With Contacts—Part 2: Dimensions and Location of the Contacts", ISO/IEC, 1999, 10 pages.

"Information Technology—Identification Cards—Integrated Circuit(s) Cards With Contacts—Part 3: Electronic Signals and Transmission Protocols", ISO/IEC, 1997, 32 pages.

"Identification Cards—Integrated Circuit(s) Cards With Contacts, Part 10: Electronic Signals and Answer to Reset for Synchronous Cards", ISO/IEC. 1999, 13 pages.

"The MultiMediaCard System Specification", MMCA Technical Committee, Version 3.1, Jun. 2001, pp. 1-130.

GB 0401853.7 "Examination Report Under Section 18 (3)"; Nov. 30, 2004, 5 pages.

Smith, et al. "Building a High Performance, Programmable Secure Coprocessor"; IBM T. J. Watson Research Center, Yorktown Heights, New York, USA, Oct. 16, 1998, pp. 1-39.

* cited by examiner

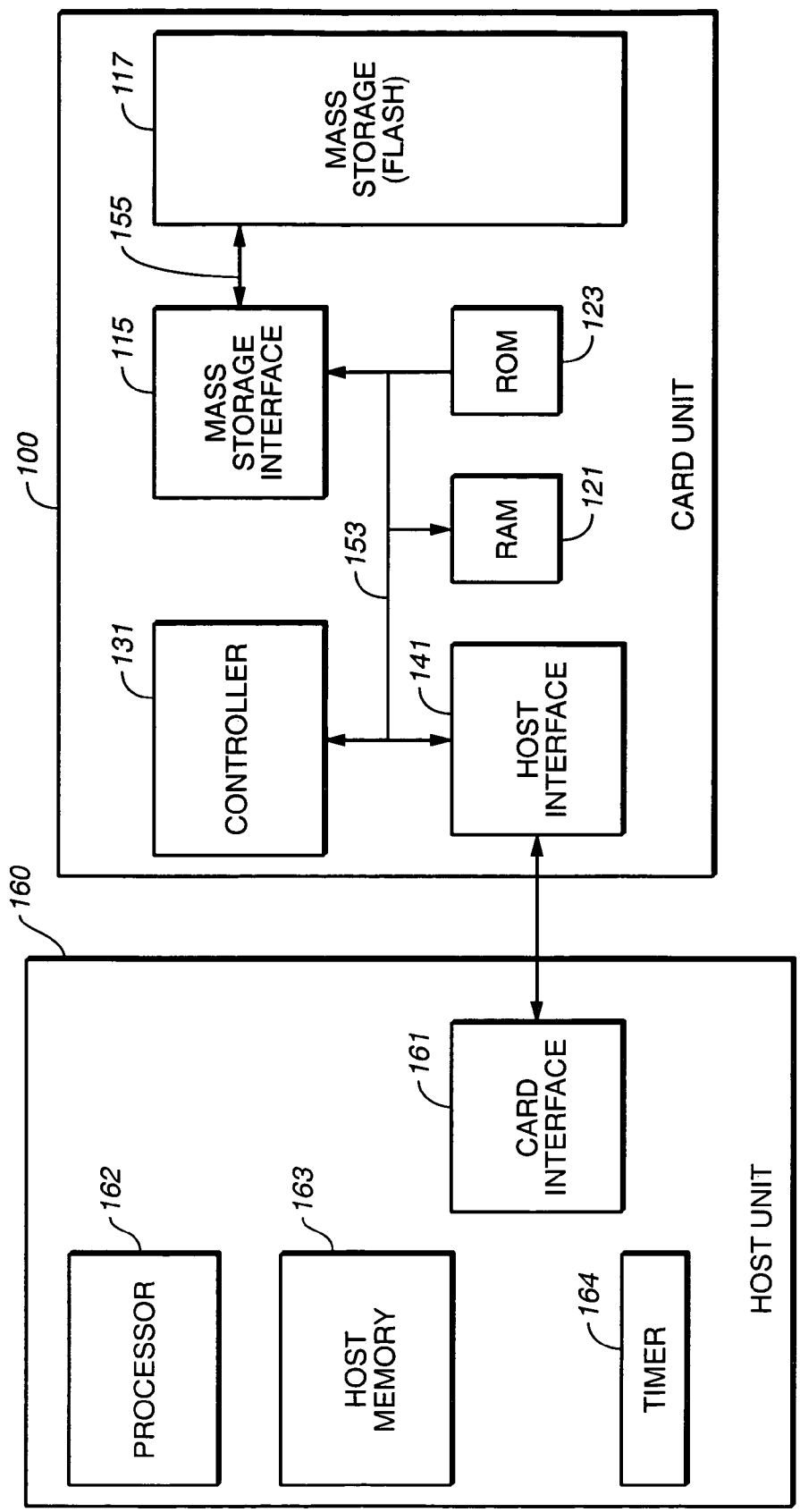
FIG._1
(PRIOR ART)

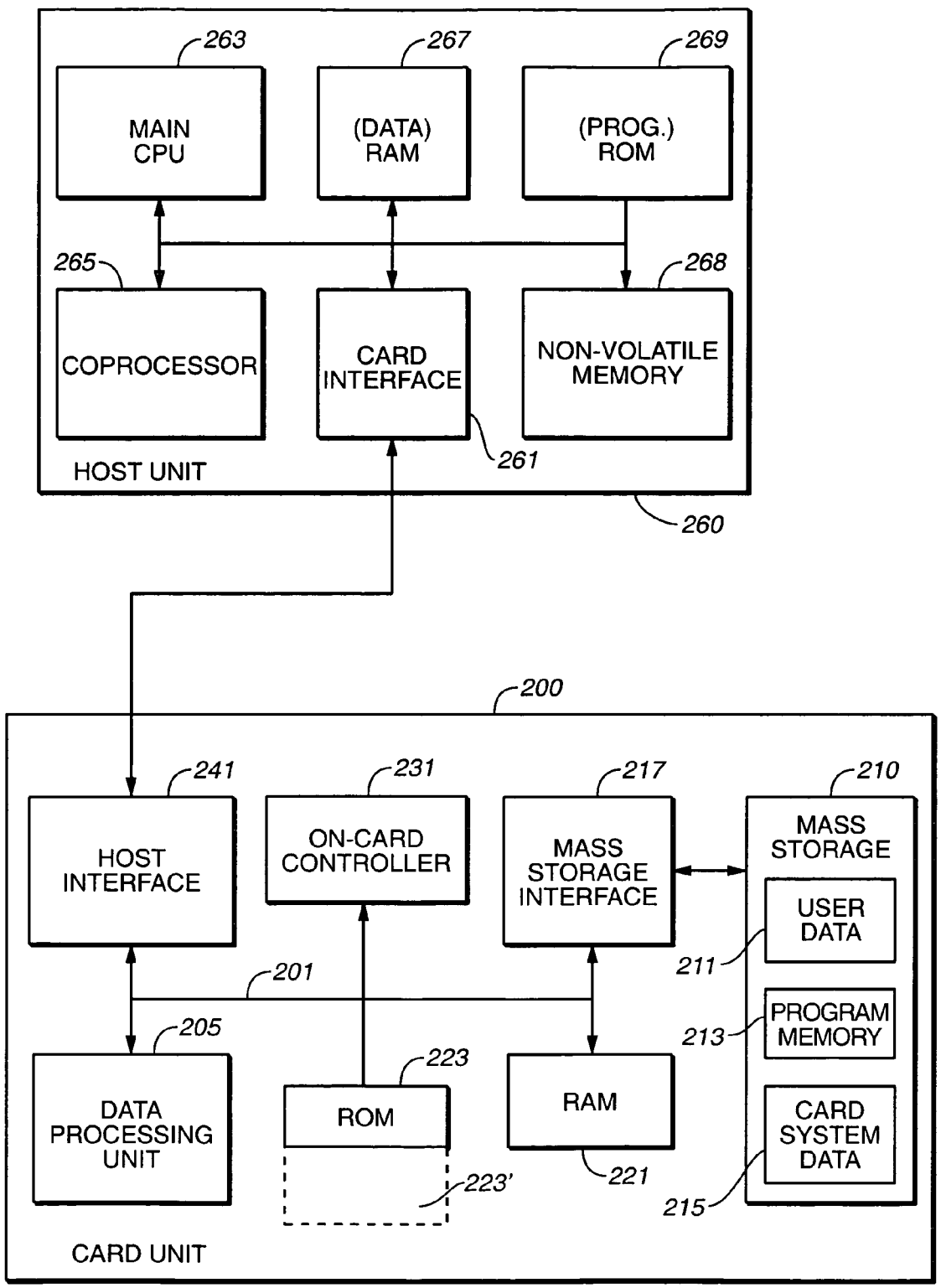
FIG._2

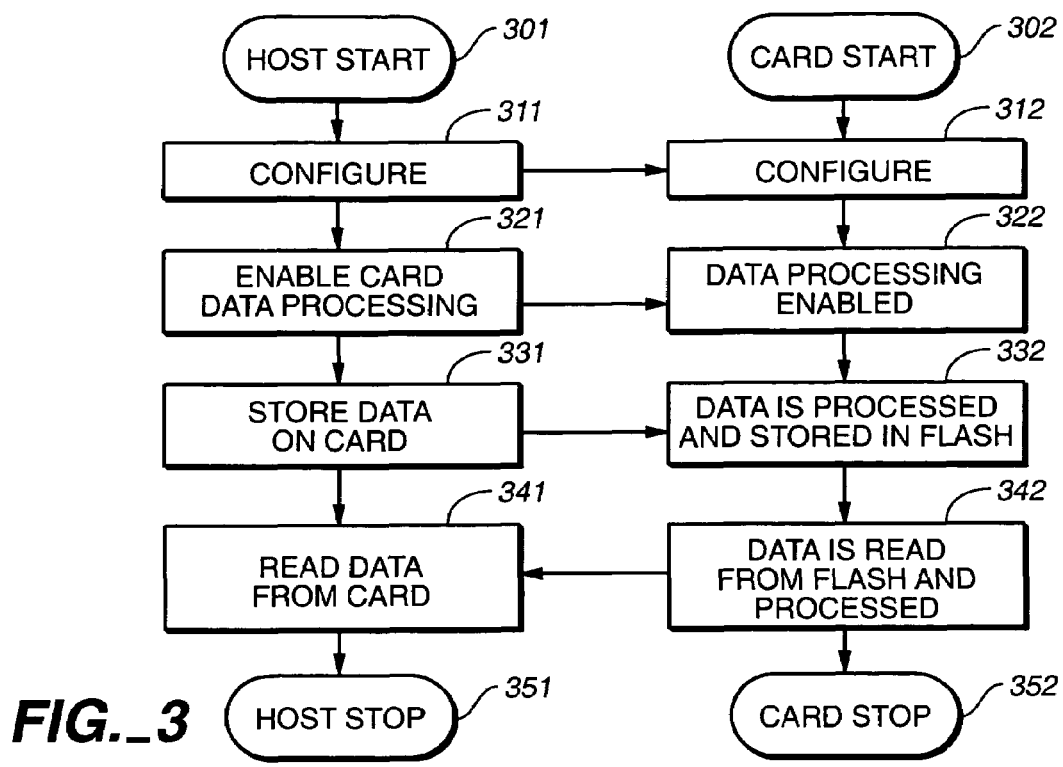
FIG._3
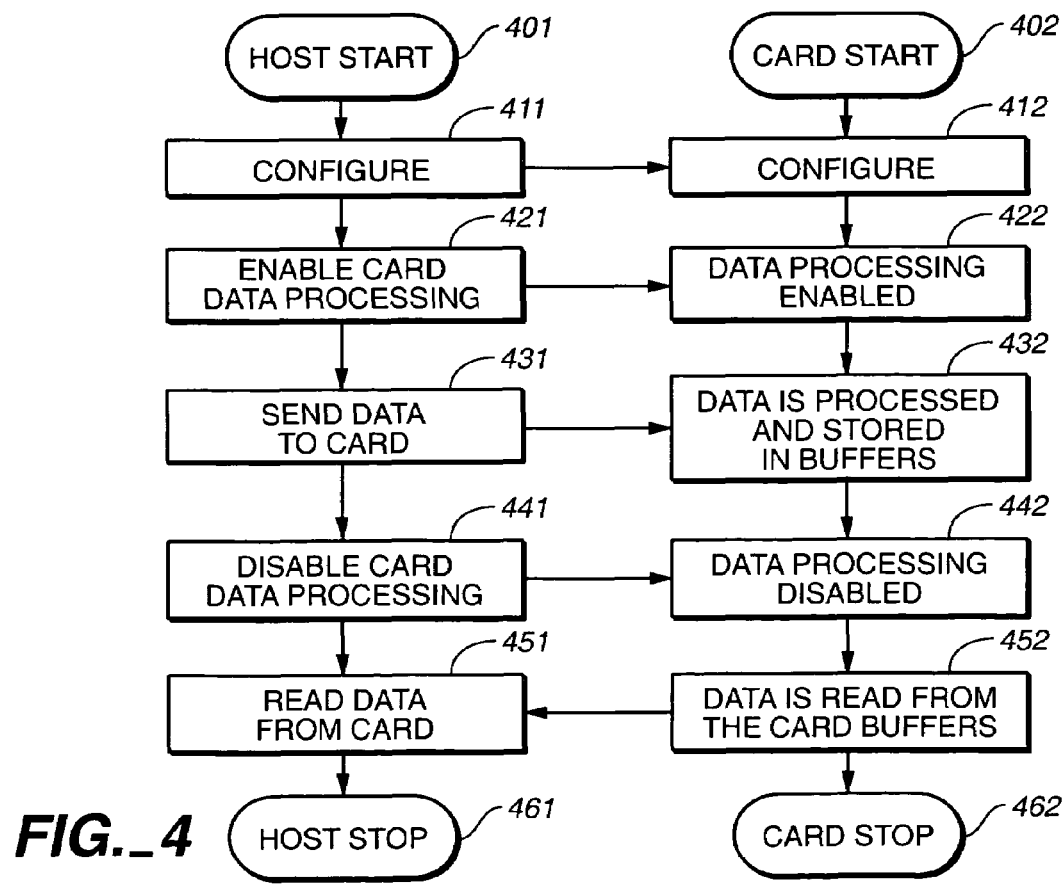
FIG._4

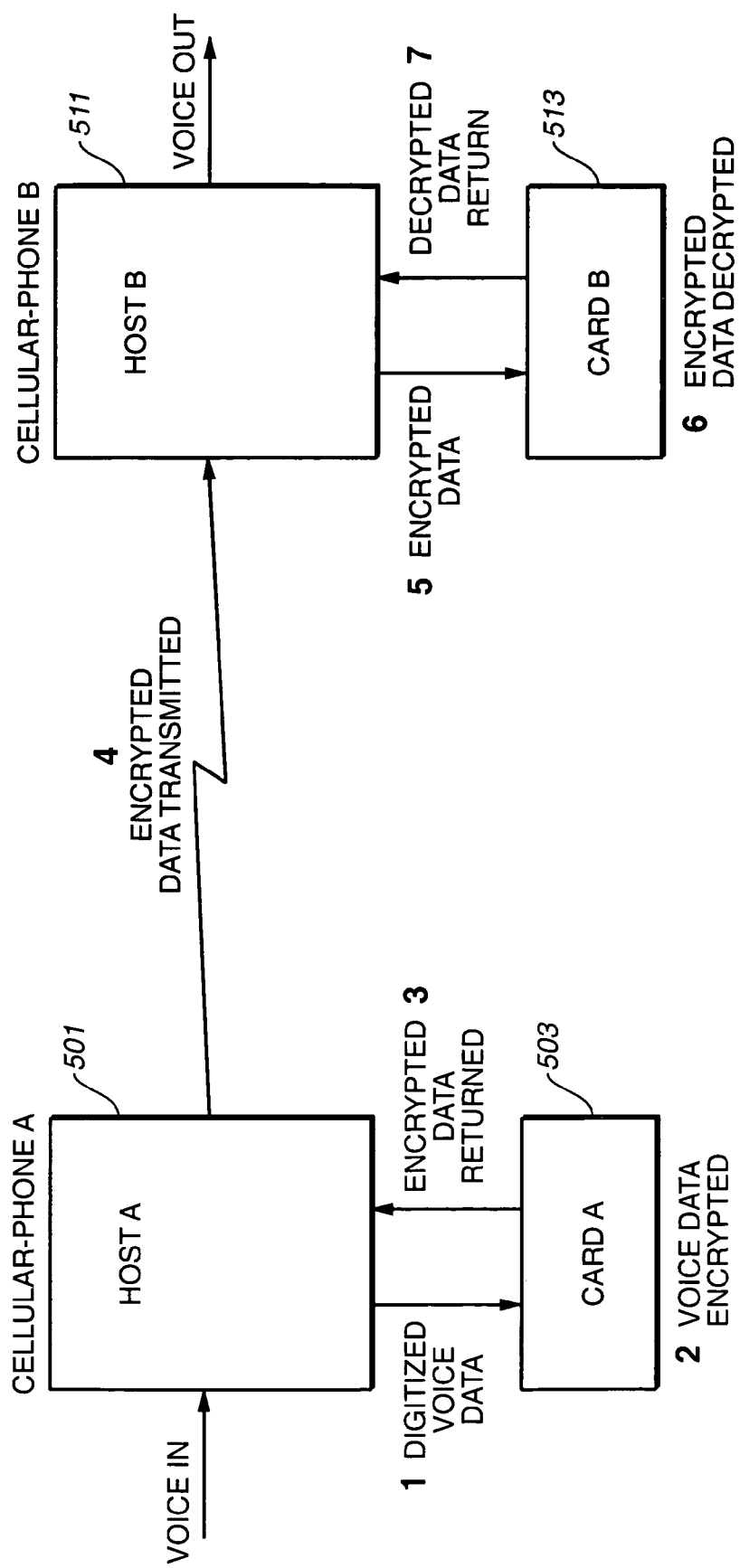
FIG._5

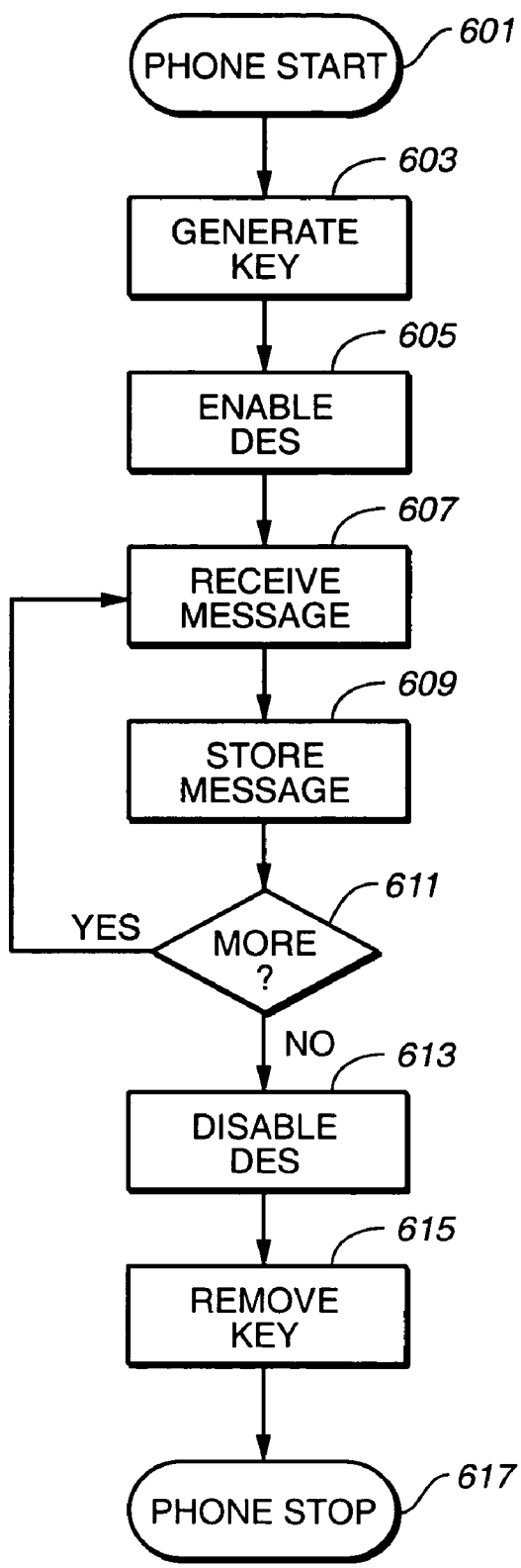
FIG._6

REMOVABLE COMPUTER WITH MASS STORAGE

BACKGROUND OF THE INVENTION

1. Field of the Invention

The present invention relates to digital media, and more particularly to digital media such as cards and modules and combinations. Particularly, the present invention relates to an add-on card unit detachably coupled to a host unit where the card unit contains mass data storage and is capable of providing additional processing power to the host unit.

2. Background Information

In recent years, there are a variety of add-on cards and modules developed for use in digital systems such as personal computers ("PC"). They have enjoyed a measure of success in various memory-intensive applications. Some of these memory add-on cards use flash memory, and are known as flash memory cards. Flash memory cards have become widely used for mass data storage applications, and are a popular alternative for conventional add-on card implemented non-volatile memory solutions such as rotating hard disks and battery-backed SRAM, especially for notebook computers, personal data assistants ("PDA"), and some high-end digital cameras. As an alternative to rotating hard disk PC cards, flash memory cards are more rugged and space efficient, are silent, consume less power, provide higher performance (in most cases), and provide a removable form-factor. As an alternative to battery-backed SRAM PC cards, flash memory cards typically offer higher-densities and lower cost per bit and are not as limited by reliability and temperature issues associated with batteries used in the battery-backed SRAM PC cards.

Generally, these memory cards perform only auxiliary storage functions for the host systems. In some cases, some simple data processing functions are performed in this card. There are currently various standards on these PC cards developed by different vendors. Each of these memory card standards defines a card type that is able to perform some storage functions. The following is a brief summary of various standards in the memory cards industry Flash PC cards are compliant with the Personal Computer Memory Card International Association ("PCMCIA") standard. While flash PC cards can provide sufficient amounts of memory for a broad range of applications, they have not been widely accepted for use in applications such as mobile and portable electronics, or for use in applications having significant cost sensitivity. PC cards simply tend to be too large for many portable applications such as pagers, voice recorders, mobile telephones, and hand-held meters. In addition, PC cards are also too bulky and heavy for carrying in a pocket or wallet, as would be desirable for many consumer applications.

An example of a PC card that adds functionality to the host system is described in U.S. Pat. No. 6,047,342 of Depew. The device of this patent receives data from the host, operates on the data, and returns the processed data to the host. This system provides no mass storage on the card and stores the data being processed only in RAM for buffering purposes.

Compact flash card is a small format flash memory card that was initially announced by SanDisk Corporation in 1994. The compact card supports the IDE/ATA interface standard by means of an on-card ATA controller IC. Memory capacity of up to 256 Megabytes is currently available. Both 5 volt and 3.3 volt power supplies are supported. A compact flash card is interfaced to notebook computers and PDAs by inserting the card into a special PC card adapter.

Miniature card is a small format card that was initially announced by Intel Corporation in 1995. The miniature card supports a linear addressing range of up to 64 Megabytes of memory using a 16-bit data bus. The miniature card specification allows for flash, DRAM and ROM memory types. Both 5 volt and 3.3 volt power supplies are supported by the specification. A miniature card is interfaced to notebook computers and PDAs that support the standard PC card interface with a special PC card adapter. A miniature card specification is described in Miniature Card Specification, Release 1.0, February 1996, available from Intel Corporation of Santa Clara, Calif.

Solid state floppy disk card, or SSFDC, is a small format card initially announced by Toshiba Corporation in 1995. The SSFDC has 22 flat contact pads, some of which are I/O pads for both address and data input and output as well as for command inputs. The card specification is dedicated to byte serial NAND-type flash memory. The specification accommodates 5 volt or 3.3 volt power supplies. An SSFDC is interfaced to notebook computers and PDAs that have the standard PC card interface with a special PC card adapter. An illustrative device is type TC5816ADC, which is described in Preliminary TC5816ADC Data Sheet No. NV16030496, April 1996, available from Toshiba America Electronic Components, Inc. of Irvine, Calif. The device is said to be suitable for such applications as solid state file storage, voice recording, image file memory for still cameras, and other systems which require high capacity, non-volatile memory data storage Siemens Components of Cupertino, Calif. has described a device known as MultiMediaCards, or MMC; see Portable Design, July 1996, p 23 et seq. The original MultiMediaCard package had 6 edge-mounted contact pads and users a serial bus. This format has been extended into a 7 pin format as described in "The MultiMediaCard System Specification" produced by the Technical Committee of the MultiMediaCard Association (MMCA). The specification accommodates a various range of voltage supply. The device is suitable for such applications as games, talking toys, automobile diagnostics, smart phones, PDAs (tailored operating systems or special programs), and notebooks through a PDA adapter. These cards provide mass non-volatile storage, but lack processing capabilities. The MultiMediaCard design has been further developed as the Secure Digital, or SD, card. This design adds additional data pins and security features to the MultiMediaCard package.

Integrated Circuit (IC) card format and the similar Identification (ID) card format, commonly known as smart cards, were introduced in the mid 1980's and have been standardized by the International Organization for Standardization, Identification Cards—Integrated Circuit Cards with Contacts, Part 1: Physical Characteristics, Document No. ISO 7816-2, May 1988; and International Organization for Standardization, Identification Cards—Integrated Circuit Cards with Contacts, Part 3: Electronic Signals and Transmission Protocols, Document No. ISO 7816-3, September 1989. Smart cards are credit card sized and typically contain a microcontroller with a small amount, on the order of a few kilobytes, of EEPROM memory. The cards are popular in Europe and are making inroads into the U.S. market. Primary application are smart telephone calling cards and stored value cards, the later application being promoted by credit card companies like Visa and MasterCard as a replacement for paper currency. Although these cards have some processing ability on the card, it is not available to the user and does not let the user add ability to the combined system. Any processing ability is fixed by the card's issuer along with the initial data prior to the user receiving the card. The smart card system does not execute any additional functions for the user and are just for the secured storage of data, either for security uses or for keeping a stored value, and the processing ability of the card is relegated to managing these functions based on the issuer's determination. This allows for a secure link only between the card and the host.

Another low memory capacity card format is known as the Subscriber Identification Module ("SIM"), which is used in conjunction with mobile telephones based on the Global System for Mobile Communication ("GSM") standard. The SIM specification is set forth in a publication of the European Telecommunication Standard Institute entitled European Digital Cellular Telecommunication System, Global System for Mobile Communications, Phase 2: Specification of Subscriber Identity Module—Mobile Equipment Interface, Document No. GSM 11.11 Reference (RE/SMG)—091111PR3, ICS 33.060.50 December 1995. SIMs offer only a very limited amount of memory, typically less than one kilobit. However, this small amount of memory is sufficient to provide a GSM mobile phone with secure identification of the GSM subscriber, and may also hold a small amount of data for call metering, phone number storage, and in some cases very short data messages (less than a few hundred bytes of data). The plug-in SIM typically is housed in a small hinged smart card connector similar to the type CCM03 available from ITT Cannon Corporation of Santa Ana, Calif. The small form factor allows the GSM SIM to be placed inside the phone as a plug-in module.

Other memory technologies have not been widely used in insertable/removable memory modules and cards because of their inherent shortcomings relative to such successful technologies such as flash memory. For example, battery-backed SRAM or DRAM memories require supplemental battery power when the main power is removed, while flash memory is non-volatile (no battery is needed) and is more reliable over temperature. Flash memory is available in higher densities and at lower cost/bit than SRAM and EEPROM memory, and is cost-competitive with DRAM memory.

In some cases, data processing is performed on the data before being transmitted to the PC card for storage. In these cases, data is processed in the host unit and then transmitted from the host unit to the card unit for storage. For example, data can be encrypted in the host and then the encrypted data is sent to the memory card for storage. Another example is data being compressed in the host and then sent to the memory card for storage.

FIG. 1 shows a conventional system having data processed by the host unit and then transmitted to the PC card for storage. As shown in the figure, the system comprises two units: a host unit 160 and a card unit 100, for example a standard MultiMediaCard or SD card. Generally, the host unit can be a consumer apparatus such as a cellular phone, a PDA, a Palm Pilot, or a personal computer. The host unit 160 comprises a processor 162 and other supporting components, such as a host memory 163, a timer 164, and a number of other standard elements not shown here. Furthermore, the host unit further comprises a card interface 161 for communicating with the card unit 100. The host interface 161 can be implemented using any of the above-mentioned protocols defined by the various manufacturers or associations.

As shown in FIG. 1, the card unit 100 generally comprises a host interface 141, memory storage and, in some cases, an on-card micro-controller. For the example shown, the host interface 141 of the card unit is used for communicating with the host unit 160. The on-card micro-controller 131 is used to control the loading of data from the host unit to the memory storage. In addition, the controller is designed for handling memory functions such as addressing and buffering. The controller 131 and host interface 141 are connected to the card bus 153, to which may also be connected some non-programmable ROM memory 123 for program storage and a RAM memory 121, usually volatile, that can act as a cache, as described for example in U.S. Pat. No. 5,418,752 and U.S. Pat. No. 5,172,338, which are both hereby incorporated by this reference. The mass storage memory 111, that will be FLASH memory on an MultiMediaCard or SD card, is not connected directly to the bus 153, but is instead connected through 155 to mass storage interface 115, which is in turn connected to bus 153. The mass storage interface 115 serves as a "non-linear" or "non-random" access interface for controlling the FLASH memory where data is stored in a non-linear fashion. The contents in the mass storage memory 111 can not be addressed randomly by the controller 131, or, more accurately, can only be accessible in blocks that are too large for the controller to utilize without first reading out and caching the whole block.

However, the system design as shown in FIG. 1 suffers from performance problems when data is required to be processed (e.g. compression/decompression and/or encryption/decryption) before being stored in the memory storage. The data processing usually requires intensive mathematical computation that can greatly degrade the performance of the processor in the host unit. Additionally, operating sequences stored on the card are in ROM 123. In a actual card, the physical size of the ROM 123 portion is relatively quite large and costly, so that the number of operating sequences that can be stored are restricted by the desire to minimize the amount of ROM.

SUMMARY OF THE INVENTION

The present invention provides a detachable add-on card unit to a host system that combines mass storage capability and a processor on the same card. Further, the mass storage can store operating sequences programmed by the user as well as the user data and card system data. This allows the card to better utilize its storage capability as the card can receive data from the host, process the data, and store it in processed form, as well as the reverse process of retrieving stored data, processing it, and supplying it to the host. For example, the card may have compression or encryption capabilities lacking in the host: The card can receive data from the host, compress or encrypt it, and store it in this processed form. The processed data can then be retrieved, decompressed or decrypted, and supplied to the same or a different host.

The combination of mass storage and a processor also adds to the capabilities of the on-card processor, allowing the card to store and execute programs. These programs can be pre-loaded or user loaded so that the present invention is able to provide a programmable add-on card unit to a host system. A number of applications can be stored in the card's mass storage and loaded as needed by the on-card micro-controller. These applications can be loaded on the card from the host as selected by the user as well as pre-loaded onto the card. In addition to storing applications programmed by the user, the mass storage can hold programs related to the basic functionality of the card, thereby reducing ROM requirements. The processor in the card thus provides additional processing power to the host, both in terms of adding functionality and in terms of adding capability within an existing functionality. This allows the card's processor and host's processor to work together on both the instructional and application level. The mass storage capability can additionally store portions of programs as a card system software virtual memory to extend the cards ROM.

In addition to general user programmed applications, particular examples of the use of such a card include assisting a host system in data encryption/decryption, providing security features to a host system, providing an online secure link to a communication system, and providing a secured storage to a host system.

The present invention discloses an add-on card system comprising a host unit and a card unit. According to one aspect of the present invention, the card unit can be detachably coupled to the host unit to provide additional processing power to the host unit. The card unit is programmed with at least one operating sequence for processing data provided by the host unit. Particularly, the host unit is capable of downloading new operating sequence, or upgrading existing operating sequence, into the card unit. In one embodiment of the present invention, the card unit is provided with a main storage for storing processed data for future retrieval by the host unit. In some cases, the processed data will be re-processed before returning to the host unit. By using the card unit to provide additional processing power to the host unit, different schemes of data security features can be implemented.

Additional objects, features and advantages of various aspects of the present invention will become apparent from the following description of its preferred embodiments, which description should be taken in conjunction with the accompanying drawings.

BRIEF DESCRIPTION OF THE DRAWINGS

FIG. 1 shows a conventional system having data processed by the host unit and then transmitted to the PC card for storage.

FIG. 2 shows an exemplary embodiment of an add-on card system according to the present invention.

FIG. 3 is a flow chart showing the card used as a smart storage device.

FIG. 4 is a flow chart showing the card performing a data processing algorithm only.

FIG. 5 illustrates another aspect of the present invention by showing a secured communication system comprising two host units.

FIG. 6 is a flow chart of an embodiment where the card receives, encrypts, and stores the message in encrypted form in the mass storage memory.

DESCRIPTION OF REPRESENTATIVE EMBODIMENTS

FIG. 2 shows an exemplary embodiment of an add-on card system according to the present invention. The card system as shown in FIG. 2 comprises two units: the host unit 260 and the card unit 200. The host unit 260 as shown in FIG. 2 is similar to the host unit 160 as shown in FIG. 1, although a different set of its elements are explicitly shown. The card unit 200 according to the present invention is designed differently when compared to the card unit 100 as shown in FIG. 1.

As shown in FIG. 2, the card unit 200 again includes host interface 241 for communicating with the host unit and which in turn communicates to the rest of the card through bus 201. The on-card micro-controller 231 performs the same functions as the controller 131 of FIG. 1 and is used to control the loading of data from the host unit to the memory storage, but now has additional capabilities as a processing unit. A mass storage interface 217 is again connected between the mass storage memory 210 and the bus 201. RAM memory 221 can act as a cache or buffer for data being written into or read from the mass storage 210 and ROM 223 serves as program memory. The program memory in an MultiMediaCard or SD embodiment is usually non-volatile FLASH ROM and stores operating sequences to be performed in the on-card micro-controller 231 and may, in some cases, also provides storage area for storing relevant data during data processing. Data processing unit 205 is generally non-configurable by the host and performs specific functions, such as mathematical functions that may be required by the controller 231 in the execution of a particular operating sequence thereby enhancing its performance.

The card unit of FIG. 2 differs from that of FIG. 1 in several respects. Card 200 now allows controller 231 to process data received from the host unit 260 or the mass storage memory 210 according to the operating sequences from program storage, possible in conjunction with data processing unit 205. Mass storage interface 217 again supplies the hardware needed for the controller to communicate with the mass storage 210. Also, the mass storage memory 210 is now subdivided into a portion 211 for storing user data, which may have been processed by unit 205 before storage, a portion 215 to hold card system data, and, in some embodiments, a program memory portion 213. The card system data portion 215 stores data needed by programs during the execution that is generally not for the user's access and is here distinguished from the user data portion 211. For example, the relevant data stored in the card system data portion 215 might include encryption key, voice signature, key sequences, biometric data, and so on, which in some cases, such as an encryption key, may be user provided.

Program memory portion 213 is card system software and can store portions of programs, in effect allowing the card to have a larger ROM for its various applications. This is shown in FIG. 2 by the broken line extension of ROM 223 as the virtual memory 223'. As ROM is typically a relatively large and costly portion of the physical size of a card, the ability to reduce ROM requirements can be quite useful. For example, in addition to user programmed applications, many of the basic functionalities of the card itself (such as test programs, defect management, formatting, configuration, and so on) that are not frequently used and take up a lot of space can be stored in program memory portion 213.

The ability to store both user data and user programmed applications in mass storage 210 makes the present invention powerful and flexible. The user can program the operating sequence the user causes to be executed as well as the data, instead being restricted to the operating sequences loaded by the manufacturer or card issuer that is not the ultimate user of the card, as is the case in prior art systems such as the smart card. As mass storage 210 stores data in a non-linear structure, a sequence to be executed is retrieved by the interface 217 and stored in a linear form usable by controller 231. In this linear form it may be stored in RAM 221 or in a ROM cache for those embodiments with a cache structure for ROM 223.

According to the present invention, the card unit 200 is detachably connected to the host unit 260. After the card unit is attached to the host unit, data is transmitted from the host unit to the card unit through the two interfaces (i.e. host interface 241 and card interface 261). When the card unit receives the data from the host unit, the card unit processes the data according to the operating sequence stored in the program storage. Depending on the type of instructions enabled from those configured on the card unit, the processed data is either transmitted back to the host unit or stored in a main storage of the card unit. For example, if the host unit requests data processing from the card unit only, the card will then transmit the processed data back to the host unit without storing the processed data in the card unit. In this case, the card unit is not required to have a main storage. On the other hand, if the host unit requests the processed data to be stored in the card unit, the processed data will be stored in the main storage of the card unit after processed. It should be noted that in this case, the processed data is then portable because the card unit can be detached with the host unit after the data is processed.

Although the present invention is implementable to varying degrees in any of the formats discussed in the Background section and using the various corresponding protocols, it will be described mainly in terms of an MultiMediaCard or SD card embodiment in order to make the discussion more concrete. More details on MultiMediaCard cards are described in U.S. patent application Ser. No 09/185,649, "Voltage Negotiations in a Single Host Multiple Cards Systems", and Ser. No. 09/186,064, "Multiple Mode Communication System", both filed on Nov. 11, 1998, and both of which are hereby incorporated by this reference. More details on SD cards are described in U.S. patent application Ser. No. 08/641,023, "Multiple Removable Non-Volatile Memory Cards Serially Communicating with a Host", filed on Aug. 17, 2000, which is hereby incorporated by this reference. In addition to a card-type implementation, the various aspects of the present invention may also be implemented in an embodiment as an embeddable component, such as that know as TriFlash that has the structure of an MultiMediaCard or SD card but in the form factor of an embeddable chip.

These cards are removable flash memory cards that include the memory array and a processor based controller that performs the memory control functions and the host interface function. When added to an application it increases the amount of memory available to the application and enables new, memory intensive, functions. Similarly the on-card processor can be used for application related functions rather than memory control functions and, serving as a removable co-processor, enhance the computing power of the application. The combination of removable computer that includes large memory space and available (to the application) additional computing power is very powerful. The discussion below describes the concept of the new device, lists several examples for applications, and describes some of them in detail.

The idea of a co-processor, such as 265 of FIG. 2, that implements specific functions which the main, generic, processor is not very effective in executing, is known in the art. In the present invention differs in that the co-processor comes in a form of a removable card that includes the hardware, software, and the storage space. Thus, in the exemplary SD or MultiMediaCard card embodiment, systems designed to use the card will be capable of utilizing the new functions, with the new features accessible through the pins of the serial communication channel. Allocating the specific functions to the processor-card will decrease the complexity and price of the main processor of the applications, will allow add-ons application that can be developed, distributed, and priced separately and enable the users to tailor the equipment to their needs. For example, as discussed below, this arrangement allows continuous media, such as audio, video, or other streamable content, to be stored in compressed form on the card along with decompression capability lacking in the host, so the continuous media can be supplied to the host in decompressed form. In addition to continuous media, other examples of compressed data may include other large data files, for example a high-resolution X-ray.

In this way, the card can add both functionality and power to the host. An example of an added functionality is the ability to decompress data, whether from the mass storage on the card or supplied to the card, that is lacking in the host system. The card can also increase the power of a functionality already found in the host. In this way, a function can be partially or entirely off-loaded by the host on to the card as decided by the user, allowing increased flexibility in the application level software of the host/card system.

In a standard coprocessor arrangement as shown in the host unit 260 of FIG. 2, the main CPU 263 and coprocessor 265 work in parallel, more or less independently. When CPU 263 fetches an instruction from ROM 269, if the CPU does not understand this instruction it suspends operation and the instruction is picked up off the bus and executed by coprocessor 265. Thus, the main CPU and coprocessor are cooperating on the instructional level. In contrast, the present invention allows the card 200 and the host to work together on the application level where the main CPU 263 of the host is now aware of the on-card controller 231 and, if needed, data processing unit 205 when executing the program. When working on a problem together in this manner on an application level, the host will be explicitly allocating processing tasks to the card. In this case, part of the application may be stored, either preloaded or by the user, in program memory 213 and from there loaded for the card's data processing unit 205.

A number of examples are given below. Many of these are fairly standard applications chosen to illustrate how they may be utilized with various aspects of the invention. As the card is programmable, is should be kept in mind that the applications a user can program in to the card extend far beyond these examples.

As a first example, consider the host to be a portable phone with a limited internal phone book and with the mass storage on the card serving as a larger, supplemental phone book. In the prior art, the search in both of these phone books would be conducted in the host. If the user enters a requested name that is not found in the internal phone book, the supplemental phone book would be searched by getting each name in the supplemental book, passing it through the interfaces to the host, and examining it in the host. This process is repeated for each name in the supplemental phone book until the sought for name is found, consequently resulting in passing a large amount of data across the interfaces. In the present invention, the card can employ a search application on the card, either after the host searches its internal memory or at the same time. In this way, only the requested name is passed across the interfaces to the card, the card itself performs the search of the mass storage, and only the result is sent back to the host.

Another example is the use of the card as navigation data base, such as maps, that can interface with, for example, a global positioning system (GPS). The data base could consist of a series of maps on differing scales having a hierarchical structure, with the entire map algorithm on the card. Based on the GPS information supplied by the host, the card could then determine and supply the map for the appropriate area at the appropriate scale back to the host.

The data search application for use with the phone book or map data bases are examples of applications that may be stored in the either ROM 223 or program memory 213. As already noted, these applications can be preloaded on the card or, in the case of program memory 213, supplied by the user. By having a number of applications stored partially or completely in mass storage 210, these applications can be loaded as needed by controller 231. This differs from the prior art, such as the smart card, where a functionality cannot be off-loaded from the host on to the card by the end user. Additionally, traditional prior art card designs lack the mass storage capability for both program data and user stored data.

Before considering a number of additional examples in more detail, consider the example again of a card with a decompression application with continuous media stored in its mass storage in compressed form, say music in MP3 format. The card may be supplied with the content and application pre-recorded. The card could then be used in a host, such as a personal data assistants ("PDA"), with a card slot, a CPU, and audio capability, but without decompression or extensive storage capacity, to provide music. Alternately, the decompression capability and the data, either already in compressed form or to be compressed on-card, can be loaded by the user from another host, such as a personal computer. In either case, the card would read the stored media from the user data 211, supply it through mass storage interface 217 to bus 201, decompress it in controller 231 using program memory of either ROM 223 or virtual ROM 223' (from program memory 213), and supply it to the PDA through interface 241 for play back.

Thus, the present invention has the ability to modify the operating sequence stored in the card unit. In other words, new and updated operating sequences can be added to those already in the program storage of the card unit. In one embodiment, the program storage in the card unit for storing the operating sequence is a rewritable memory. Preferably, it is also a non-volatile memory such as a Flash EEPROM. By having a rewritable non-volatile memory as its program storage, the host unit is able to download new operating sequences, from the host or the card's mass storage, or update the current operating sequences in the card unit. For example, in a card unit programmed for data encryption and decryption, different and/or new encryption/decryption schemes can be loaded into the system by the user of the card. This allows the user to update or customize their security applications.

It should be noted that the present invention is not limited to a specific protocol to handle the communications between the host unit and the card unit. According to the present invention, each of the host and card interfaces in the system can be designed to run any protocol as discussed in the previous paragraph. For example, any of the MMCA, PCMCIA, PC card or SIM protocols can be used in the present invention for handling the communications between the host unit and the card unit.

According to the present invention, data can be downloaded from the host unit to the card unit either for storage, back to the host. In addition, new or upgraded software can be downloaded from the host unit to the program storage of the card unit for instructing the card unit to handle the data provided by the host unit.

In addition to processing data already stored on the card, the combined system of host and card can operate on data from the host. Returning to FIG. 2, the card unit 200 as shown comprises an interface 241 for communicating with the host, an on-card controller 231 for controlling and coordinating different components within the card unit as well as for processing data provided by the host unit 260 or stored on card, a program storage ROM 223 coupled to controller 231 for storing at least one processing sequence, a data processing unit 205, mass storage 210, such as a flash memory, that may interface 217 for controlling the operations of the main storage 210, and a memory buffer RAM 221 as a temporary storage for the card unit. In the exemplary embodiment shown in FIG. 2, the card interface 261 and the host interface 241 work together for handling the transferring of data and commands between the host unit 260 and the card unit 200. These two interfaces work as a host-slave card environment capable of running any available protocol. For example, the above-mentioned MultiMediaCard protocol can be implemented so that the card unit can be designed to conform to the physical specification of the MultiMediaCard specification.

The controller 231 is a general computational unit that can handle different processing needs. In the following examples, this data processing unit can handle encryption, decryption, compression, decompression, voice verification, security verification, and so on, as well as other applications programmed by the end user. In each particular case, at least one operating sequence will be stored in the program storage 223 or 223' of the card unit. The details of different processing will be discussed in the following examples.

Another aspect of the present invention is the use of the program memory section 213 for storing applications accessible by the controller 231. In the prior art, the program storage is a non-rewritable memory such as a ROM 223 so that the operating sequence stored inside is pre-programmed by the card unit manufacturer or issuer. For example, a specific encryption/decryption operating sequence is prestored in the ROM 223 by the manufacturer. In this case, the data received by the card unit 200 from the host unit 260 will be processed only according to the pre-stored operating sequence. If new operating sequence is desired by the user, a different card unit is required.

Instead, in an embodiment of the present invention, the program storage 213 is a rewritable non-volatile memory such as a flash memory. By using the mass storage 210 as the program storage instead of, or in addition to, using ROM 223 as discussed in the previous paragraph, the host unit 260 can download a new or upgraded operating sequence to the card unit 200 so that new or upgraded operating sequences can be executed in the card. According to this aspect of the present invention, the host unit sends a new or upgraded operating sequence to the card unit through the two interfaces according to a protocol. The card unit then stores or updates the program storage attached to the data processing unit. By providing this downloading and updating feature, a general card unit is able to satisfy various needs of the host unit.

In another embodiment, the program storage can be designed to store multiple operating sequences. For example, the program storage of a card unit can store both encryption/decryption sequence and compression/decompression sequence. By having multiple operating sequences stored in the program storage in the card unit, the host unit can select one or more sequences from the list of the pre-stored sequences for data processing. In this case, one or more of the operating sequences in the program storage 223 or 213 can be selected by the host to process data received from the host unit. In another design, the card unit can be preprogrammed so that multiple operating sequences (e.g. encryption and compression) will be applied to the data received from the host unit.

Operating sequences stored in program memory 213 are stored non-linearly through the mass storage interface 217 to achieve higher storage density. When a sequence is needed for execute, thereby forming part of the extended memory 223', the code needs to be retrieved and put into linear form for controller to be able to utilize it.

Consider a case where the controller 231, in conjunction with data processing unit 205 if needed, operates on the data from the host 260 without storing the data on card except for buffing. For example, in some cases the host unit can request the card unit to perform data compression only (without storing the compressed data in the card unit). After the data is compressed in the card unit, the compressed data is returned to the host unit. In other cases, the host unit can request both compression or encryption performed on any data received before retransmitted back to the host unit. It should be noted that each of the requested operating sequences is stored in the program memory 213, and of course can be pre-stored or downloaded from the host unit.

Thus, the present invention can function in two complementary ways. In either case, the card can add power, functionality, or both not found or designed into the original host systems. In the first mode, the card unit comprises a flash or other mass storage memory for storing the processed data, retrieving data to be processed, or both. In the storing case, after the card unit can receive the data from the host unit, the data processing unit of the card unit processes the data according to an operating sequence stored in the program storage. In the retrieval case, the stored data, whether previously processed or not, will be stored in the mass memory for future retrieval by the same or another host unit. According to this aspect of the present invention, the card unit can be detached from the host unit and be transferred to another host unit when needed. In other words, data can be provided by a first host unit to the card unit for processing and storage; then, the processed data can be retrieved using a second host unit by attaching the card unit to the second host. It should be noted that, under this aspect of the present invention, all the data processing can be performed in the card unit instead of in the host unit as shown in FIG. 1. Thus, in this case, the entire data processing will be transparent to the host unit, and most importantly, will not load the processor of the host unit.

In the second mode of operating the invention, the card unit may not utilize, and so need not contain, the user data portion 211 of the mass storage main memory for storing processed data. In this embodiment, data is received from the host unit for processing only. After the processing unit of the card unit processes the data received from the host unit, the card unit will transfer the processed data back to the host unit through the two interfaces (i.e. host interface and card interface). Since the processed data is not stored in the card unit, the card unit does not require a main memory for storing processed data. In other words, the card unit acts as a "removable computer" for assisting the host unit to perform some specific data processing functions. For example, the host can send the data to the card unit and request the card unit to perform a specific processing function such as encryption or compression. After the processing unit processes the data, the card unit transmits the processed data back to the host unit. In this embodiment, the host unit simply supplies the data to the card unit for processing according to the operating sequence(s) stored in the card unit. Because the host unit "downloads" the data processing operations to the card unit, the entire data processing is transparent to the host unit. This feature of the present invention is particularly useful for assisting the host unit in a specific data processing function such as encryption, decryption, compression, decompression, data security, and so on. Thus, the card unit acts as an add-on feature to any host unit. For example, an encryption/decryption card can be sold to a PDA user for encrypting or decrypting data transmitted from the host unit in order to provide additional security to the data stored in the PDA. Similarly, a compression/decompression card can be sold to a PDA user for performing data compression in order to conserve limited memory spaces inside the PDA. One of the advantages of this preferred embodiment is the ability to supplement the host unit with additional computational functions while preserving the processing power of the host unit. Another example according this aspect of the present invention is the ability to provide security features to host unit. In this case, the card unit can supplement the host unit with additional security features such as password, keyword or biometric protections. Additionally, it should be noted that even if the card does not store the data being processed in the mass storage, the data may be processed with a program stored in the program memory 213 of the mass storage, may use data in the card system data section 215, or both.

These two modes of card usage are described in the flow charts of FIGS. 3 and 4. In FIG. 3, the data is processed before being written in the mass storage, after being read out of the mass storage, or both. As already discussed, these two processes are independent, but are combined in this discussion. In FIG. 4, the data is sent from the host, processed, and sent back to the host without being placed in the card's mass storage.

FIG. 3 shows an example of the card used as a smart storage device. The process starts for the host at 301 and for the card at 302. After the card unit is attached to the host unit, the host configures the card at 311 and 312 by down loading an application to the card if the card lacks the needed application. The application may instead have been previously placed on the card. Once the card is configured, the application then needs to be enabled or disabled, depending on whether the data is to be processed. The host may be transferring data on and off the card for many purposes and it may not want to invoke a particular application configured on the card for all of the transfers. For example, the card may be configured to encrypt data, but the user may not want of the data being placed on the card encrypted. Consequently, for every data transfer to be encrypted the application will be enabled, and disabled for the non-encrypted data.

At 321 the host sends an enable command to the card unit to activate the configured card unit for data processing at 322. Then, the host unit sends data to the card unit according to a protocol at 331, such as discussed in the MultiMediaCard and SD card applications incorporated by reference above. After the data is received by the card unit, at 332 the card unit processes the data according to at least one of the pre-stored operating sequence and stores the data in the mass storage already compressed, encrypted, or otherwise processed. Reading is the reverse operation. While the data processing unit is enabled (configured to do the inverse of the original data processing algorithm) the data is read from the flash at 342. The host will get back uncompressed, decrypted, and so on data at 341 and the process ends at 351 and 352.

FIG. 4 shows an example of how the card is used to perform the data processing algorithm only. This algorithm may have been previously programmed into the program memory 213 by the user. This process is similar to that of FIG. 3, although some of the steps are made more explicit here. The process starts for the host and card at 401 and 402 respectively. If the card is not previously configured for the desired application, this is done in 411, 412.

In the example of FIG. 4, the application on the card is enabled, data is transferred to the card, processed and buffered, the application is then disabled and the processed data returned to the host. For example, in the case of, say, encryption, the application is turned on so that a packet of data is encrypted as it comes onto the card; the application is then turned off prior to reading the data so that the data is not decrypted when it is transferred back to the host. In this way, data keeps flowing in a parallel encrypt/transfer process. If instead the card was being used for the inverse decryption process, the processing would be instead be disabled at 421/422 and enabled at 441/442.

At 421 the host sends an enable command to the card unit to activate the configured card unit for data processing at 422.

At 431 the data are sent to the card, but not for placement in the mass storage. After receiving the data, at 432 the data are processed on the card and placed in memory buffers, not mass storage. The host then sends the disable command at 441, thereby disabling the card at 442. The processed data is read back from the card buffers at 452 and 451. The data are now, for example, encrypted. When the host unit does not have any more data for processing, the host unit sends an end signal to the card unit. When all of the processed data are received by the host unit, the entire operation ends at 461 and 462. In the process of FIG. 4, even though the data is neither stored in nor read from the mass storage memory, the application used to process the data may be an application stored in the mass memory.

Several examples will now be given, beginning with the compression and decompression of data as already discussed to some extent above. As discussed above, the data can also be supplied already recorded on the card. The compression algorithms can be optimized for data files or, in case of a multimedia system, for Audio/Video data according to, e.g., MPEG algorithms.

When the card unit processes the data without placing it in mass storage, the card receives the data sent from the host unit, the card unit then compresses or decompresses the data provided. According to this aspect of the present invention, the host unit provides the data to the card unit for data compression or decompression. After the card processes the, the compressed or decompressed data is transmitted back to the host for use in the host unit or to be re-transmitted to other external components.

If the card unit is going to store the data, the card compresses the data received from the host unit before they are stored in mass storage memory. When the host requests data, the compressed data can be decompressed in the card unit before transferring back to the host unit. It should be noted that both the data compression and encryption can be performed on the card before the data is stored in the non-volatile memory. The card unit can then perform both decryption and decompression of the stored data accordingly when it is read back to a host.

Another application example is voice recognition. Voice recognition is a process of sampling voice commands and processing the digitized data to generate a signature that is stored along with the "meaning" of the command. When the user attempts to activate the device, vocally, the audio command will be sampled and processed again and the signature compared to the command database. If a match is found the command will be executed. A processor card capable of generating voice signatures, storing them, and maintaining the data base can be used to add voice activation functionality to devices that record voice as part of their main functionality, such as voice recorders, telephones, and most of the desk-top and hand-help computers that have sound recording and play back capabilities. The voice signatures may be stored on the same memory card or on other system memory banks. In the later case the application is using only the voice signature generation capability of the card, not necessarily combined with the storing/retrieving capability.

This aspect of the present invention also relates to a method (s) of screening user access to the system. According to this aspect, when attached to the host unit, the card unit can function as an add-on user verification device to screen user access to the host unit. In one embodiment, some or all of the functions performed by the host unit are protected by a user authorization procedure. For example, when the host unit is a cellular phone, the host unit only allows a selected group of authorized users to make long distance calls. In this embodiment, information such as voice signature, user password, and/or biometric data of the authorized user(s) is stored in the card unit in its card system data section. Thus, authorization to use the long distance function is only granted by the attached card unit, with the corresponding user's input accepted.

In a voice signature authorization embodiment, the card unit stores the voice signature of all authorized user(s) of the host unit. In addition, the card unit also stores a voice verification sequence for verifying whether an input voice capture agrees with any of the voice signatures stored.

Specifically, in order to gain access to all or a portion of the host unit, the user is required to produce a voice capture sample for the host system to verify. Once the host unit obtains the input voice capture provided by the user, the digitized input voice capture is transmitted from the host unit to the card unit for verification. The card unit then compares the received input voice capture with the voice signature(s) stored in its program storage. After the verification result is generated, the result is returned to the host unit indicating whether the corresponding user is permitted to access the secured portion of the host unit. If the voice capture sample does not agree with the voice signature stored in the card unit, the card unit will instruct the host unit to deny access of the corresponding user. On the other hand, when the voice capture sample agrees with the voice signature stored in the card unit, the card unit will instruct the host unit to grant access to the system to the corresponding user.

It should be noted that the card unit according to this invention is detachable and portable. Thus, it can be used with any generic host unit to provide voice signature verification for the host unit.

In one embodiment of the present invention, the program storage of the card unit can also be operated similar to the SIM module as discussed above. According to this aspect of the present invention, the program storage of the card unit can store user defined phone number(s) and accounting information for that specific user. By storing personal information of the user in the system data storage area of the card unit, the entire system can be tailored to any specific user.

Another example is data encryption. Memory cards may store sensitive data that the user will find it necessary to protect. The most effective way of protecting data is to encrypt it. Encryption is the algorithm of generating the cipher-text, a non-readable stream of data, from the plain-text, a stream of data in a readable form. Decryption is the algorithm of generation the plain-text from the cipher-text.

There are standard "key based" algorithm for encryption that, assuming the key is kept secret, have a well established and proven security level. Key based algorithms include both secrete (also known as symmetric) key cryptography and public (also known as asymmetric) key cryptography. Secrete key cryptography is family of algorithms which use a single key for encryption and decryption. The recipient of the cipher-text must have the key that was used to encrypt the data to be able to decrypt it. Public key cryptography is a family of algorithms that use a pair of keys, one for encryption one for decryption. The key pairs are generated in a way that a message that was encrypted with one of them can be decrypted only with the other. One key is openly published and becomes the public key. The other is kept secrete and serves as a private key.

Examples of key based algorithms include DES and RSA. DES is an established standard for secrete key cryptography. It is a block cipher algorithm which uses a 64 bit key to encrypt/decrypt 64 bit data blocks. RSA is a widely used public key algorithm using a long (128 to 1024 bits) keys and used mainly for digital signature and authentication. A hybrid system is crypto-system that uses RSA to securely transmit a DES key that is then used to encrypt the balk of the data.

A processor card that includes the encryption engine as well as the memory will be able to encrypt data on write and decrypt on read. The keys may be generated on the card or provided by the application, similarly they may be stored on the card in the system data area or kept elsewhere. If the secrete, the key, is not on the card the code is unbreakable.

The processor card can be used in conjunction with the memory (protect the data on the card) or serve as an encryption engine for the application. As an example a phone can use the card to encrypt decrypt outgoing/incoming data packets, respectively. This is a very easy mechanism to establish a secure data link between two phone subscribers.

Another usage of encryption algorithms (public key algorithms in this case) is to generate personal digital signatures and to authenticate identification. A digital signature is a method of, digitally, binding a person or legal entity with the content of a document. For example, a hashed version of a data file can be generated, concatenated with the name of the signee, and encrypted with the signee's private key. To verify the signature, decrypt it with the signee's public key and compare the result with the hashed version of the document, where hashing is an algorithm of generating a (relatively) small bit stream that represents a data file in a way that it is infeasible to find a different data file that hashes to the same string. Authenticating is a method of digitally verifying the identification of someone and is similar to digital signature but without the need of binding it to a document. On a phone system, as an examples, the encryption engine on the processor card, can be used to implement these functions with very little added to the basic phone.

An encryption card can include all hardware and software building blocks required to generate DES and RSA keys and to encrypt/decrypt data using RSA and DES. It will enable an application such as, for example, a cellular telephone to perform a number of tasks without adding hardware to the phone and without involving the service provider or cellular switching board. These tasks include encrypting incoming sensitive data and securely storing it on the card, and, conversely, decrypting outgoing sensitive data and securely transmitting it. It can also establish an online secure link with another subscriber and transmit/receive encrypted data, such as is described below with respect to FIG. 5. Due to the mass storage capability of the card, it can receive, and store on the card, encrypted data for future use. This data can then be decrypted when listened to. It can also send and receive singed messages while making sure that the content of the message and the identity of the sender are both unforgeable and non repudiatable. Further, it can verify caller identification by making sure the caller is who they claim to be. With added functionality on the phone, the card can also function as a locking key to the phone, where the phone will not work unless the card is inserted. Similarly the card can be locked from being accessed by another application, so that it can be used only in one phone.

The card can be capable of generating keys and communicating them to the phone. The application may choose to store the keys off-card to increase the security level of the data stored on the card or transmit it to the other subscriber. The card can also be able to receive the keys from the telephone, or other host, in the case where they are generated or stored elsewhere, for example the transmitter of an encrypted data message.

A complete crypto-system requires two additional functions that may not be supported by the card. The first of these is key management and distribution, a function that takes care of storing the keys and matching public keys with the true owners. The second additional function is to secure protocols for retrieving public keys and/or transmitting the secrete keys to the receiving parties. Both of these functions can be carried out by the phone subscribers in case of a direct phone to phone links. When the secure links are provided as a centralized service by the cellular service provider, they will be implemented as part of the switching board capabilities.

FIG. 6 is a flow chart of an embodiment where the card receives, encrypts, and stores the message in encrypted form in the mass storage memory. The host starts the process in the card at step 601. In step 603 the key is generated and stored on the card. The algorithm, in this case DES, is enabled in step 605. The card begins to receive the message in step 607, which is then encrypted according to the algorithm, stored in the mass memory at 609. Steps 607 and 609 are repeated until, in step 611, all of the message has been stored. The algorithm is then disabled, step 613, and the key removed is removed at step 615, at which point the process is complete and stopped by the host, step 617.

When the data is requested by the host unit, the card unit decrypts the encrypted data before transferring back to the host unit in the inverse of the process of FIG. 6. Alternately, the card could be supplied to the user with the encrypted data as well as the decryption ability already on the card. It should be noted that, in this embodiment, the key(s) for the data encryption and decryption as well as the applications themselves can be stored in the card unit for portable purposes in the mass storage. In another embodiment, the key(s) for the decryption of the encrypted data can be provided by the host unit or the user of the host unit for additional security purposes.

In its aspects as an application card, the message need not be stored in the mass storage. In this case, after the card unit receives the data from the host unit, the card unit encrypts or decrypts the data. After the data is encrypted or decrypted (depending on needs), the encrypted or decrypted data is transmitted back to the host unit for use in the host unit or re-transmit to other external component(s). For example, when the host unit receives the encrypted data, the host can transmit the encrypted data to another host unit through a regular communication channel (e.g. cellular telephone airwaves) so that a secured communication link can be established between these two host units. In this case, when the second host unit receives the encrypted data from the first host unit, the second host unit can request its own card unit to perform the data decryption. Although according to this aspect of the present invention it is not required to contain the main memory for permanently storing the processed data, the encryption/decryption applications and keys may be stored in the program storage section of the main memory. In this case, the card unit acts as an auxiliary processor for the host unit to perform a specific operation according to the operating sequence stored in the program storage in the card unit.

FIG. 5 shows this embodiment as an on line secure link, where the host unit is a communication device such as a cellular telephone capable of communicating with another host unit. The card unit is a portable device designed to provide a secured communication link to a host unit when the card unit is attached to the host unit. FIG. 5 shows the on line secure link system comprising of two cellular phones (i.e. two host units). As shown in the figure, the secured communication link is established between the fist host unit, cellular phone A 501, and the second host unit, cellular phone B 511. According to the present invention, the first host unit is attached to a detachable first card unit, Card A 503, whereas the second host unit is attached to a detachable second card unit, Card B 513.

According to this aspect of the present invention, the two card units attached to the two host units perform encryption/decryption functions for the communications between the two host units. For example, all communications transmitted from the first host unit to the second host unit are encrypted by the first card unit before transmission. On the other hand, the second card unit attached to the second host unit decrypts all the encrypted data transmitted from the first host unit. Since all the data transmitted between the two host units are encrypted, the communication link established between the two host units is secured.

As shown in the figure, the first host unit 501 is provided with voice from a user, for example, for transmitting to the second unit 511. When host A 501 detects that a first card unit 503 is attached to assist in this security function, the first host unit 501 then transfers the voice data to card A 503 for encryption. Specifically, the encryption of the voice data is performed in the first card unit according to an encryption sequence stored in the program storage, either ROM 223 or Program Memory 213 in FIG. 2, of Card A 503. After the voice data is encrypted, the first card unit 503 will then transmit the encrypted voice data back to the first host 501. When host A 501 receives the encrypted data from card A 503, the first host unit then transmits the encrypted data to the second host unit, host B 511, through a communication link established between the first host unit and the second host unit. When host B 511 receives the encrypted signal, the second host unit then transmits the encrypted voice data to the second card unit, card B 513, for decryption. The second card unit will then decrypt the encrypted voice data based on a decryption sequence stored in the program storage of the second card unit 513. The decrypted voice data will then be transmitted back to second host unit such that the corresponding voice messages can be reproduced by the second host unit to a second user.

It should be noted that the first card unit and second card unit are add-on detachable units to the two host units. Without these two card units, the two host units should still be able to communicates, however, without the secured link. Because of these detachability and transportability features, specific encryption/decryption algorithms can be selected by the users to satisfy different needs. For example, different encryption/decryption schemes can be implemented by the two card units by synchronizing the encryption/decryption algorithms and having agreeable keys.

Although the encryption and decryption can be performed within the host units (i.e. the first host unit and the second host unit), there are several advantages to placing these capabilities on the card. As already noted, the encoded data can be securely stored on the card. Besides this, it is often preferable to market a mobile telephone or other application in a low-end version lacking advanced capabilities such as encryption/decryption or, say, the phonebook ability described above. This can be done to reduce cost or size of the host. If a user wishes to upgrade the host at a later date, by simply supplying a card interface, these capabilities can be added as desired.

Additionally, the conventional designs are not as portable as the present invention. It is difficult to modify and/or upgrade the encryption and decryption sequences in the host unit when the encryption/decryption programming sequences and the encryption/decryption keys are pre-stored in the host units. According to the present invention, since the card units are portable with respect to the host units, the user can simply carry the card unit around without the need to be used with a designated host unit. In addition, different encryption procedures can be employed by purchasing additional card units, or storing additional sequences in the program storage of the current card, without the need to update the host unit (e.g. cellular phone). Thus, the present invention provides tremendous flexibility in the system design. In particular, it easily allows for security upgrades by changing the card while using the same phone.

It is to be understood that while the invention has been described above in conjunction with preferred specific embodiments, the description and examples are intended to illustrate and not limit the scope of the invention, which is defined by the scope of the appended claims.

It is claimed:

1. An add-on card for detachably coupling to a processing system comprising:
   an interface for communicating with said processing system while said add-on card is coupled with said processing system;
   a program storage memory storing at least one operating sequence;
   a mass storage memory including a portion for storing user data and a program memory portion storing at least two additional operating sequences;
   a processing unit coupled to said interface, said program storage memory, and said mass storage memory, whereby the processing unit can operate on user data transferred between the mass storage memory and the processing system through the interface according to an operating sequence selected by the processing system from said at least two additional operating sequences;
   a card bus to which the processing unit, the interface and the program storage memory are connected; and
   a mass storage interface by which the mass storage memory is connected to the card bus, wherein the mass storage interface is a non-linear interface;
   wherein the mass storage memory stores data in a non-linear structure, wherein the data is only accessible in a block that is too lame for the processing unit to utilize without first reading out and caching the block, and wherein the mass storage interface is operative to retrieve the data from the mass storage memory and store the data in a linear form usable by the processing unit.

2. The add-on card of claim 1, wherein the data transferred between the card and the processing system is continuous media.

3. The add-on card of claim 2 further comprising:
   a data cache memory connected to the processor and the mass storage memory for buffering the continuous media transferred between the card and the processing system.

4. The add-on card of claim 1, wherein said at least two additional operating sequences includes a decompression program.

5. The add-on card of claim 1, wherein said at least two additional operating sequences includes a compression program.

6. The add-on card of claim 1, wherein at least two additional operating sequences includes a data encryption/decryption routine.

7. The add-on card of claim 1, wherein at least two additional operating sequences includes a voice recognition routine.

8. The add-on card of claim 1, wherein the mass storage memory is a FLASH memory.

9. The add-on card of claim 1, wherein the mass storage memory further includes a portion storing system data, whereby the processing unit can operate on data transferred between the card and the processing system using the system data.

10. The add-on card of claim 1, wherein said processing unit selectively operates in combination with a processor of said processing system on said user data received from the processing system.

11. An add-on card for detachably coupling to a processing system comprising:
    an interface for communicating with said processing system while said add-on card is coupled with said processing system;
    a program storage memory storing an operating sequence;
    a processing unit coupled to said interface and said program storage memory;
    a mass storage memory including a portion for storing user data coupled to said processing unit, whereby the processing unit operates on user data transferred between the interface and the portion of the mass storage memory for storing user data according to said operating sequence when said operating sequence is enabled by said processing system but does not operate on the user data when said operating sequence is not enabled by said processing system;
    a card bus to which the processing unit, the interface and the program storage memory are connected; and
    a mass storage interface by which the mass storage memory is connected to the card bus, wherein the mass storage interface is a non-linear interface;
    wherein the mass storage memory stores data in a non-linear structure, wherein the data is only accessible in a block that is too large for the processing unit to utilize without first reading out and caching the block, and wherein the mass storage interface is operative to retrieve the data from the mass storage memory and store the data in a linear form usable by the processing unit.

12. The add-on card of claim 11, wherein the mass storage memory includes a program memory portion storing at least one additional operating sequence.

13. The add-on card of claim 11 wherein the data transferred between the interface and the mass storage memory is continuous media.

14. The add-on card of claim 13, further comprising:
    a data cache memory connected to the processor and the mass storage memory for buffering the data transferred between the interface and the mass storage memory, wherein the data transferred is stored non-linearly.

15. The add-on card of claim 13, wherein at least a portion of the mass storage memory contains continuous media pre-recorded by the card supplier.

16. The add-on card of claim 13, wherein said operating sequence is a decompression program.

17. The add-on card of claim 13, wherein said operating sequence is a compression program.

18. The add-on card of claim 11, wherein the data transferred between the interface and the mass storage memory is a navigation data base.

19. The add-on card of claim 11, wherein said operating sequence is a data encryption/decryption routine.

20. The add-on card of claim 11, wherein said operating sequence is a voice recognition routine.

21. The add-on card of claim 11, wherein the mass storage memory is a FLASH memory.

* * * * *

UNITED STATES PATENT AND TRADEMARK OFFICE
CERTIFICATE OF CORRECTION

PATENT NO. : 7,418,344 B2 Page 1 of 1
APPLICATION NO. : 09/924185
DATED : August 26, 2008
INVENTOR(S) : Michael Holtzman et al.

It is certified that error appears in the above-identified patent and that said Letters Patent is hereby corrected as shown below:

On the Title Page under item (56) References Cited

On page 2, column 1, line 2, under "OTHER PUBLICATIONS", after "from Internet" delete "Sep. 22" and substitute --Sep. 29-- in its place.

On page 2, column 2, line 21, before "Using Voice Biometrics" delete "Environements" and substitute --Environments-- in its place.

In the Claims

In column 18, in claim 1, line 25, after "that is too" delete "lame" and substitute --large-- in its place.

Signed and Sealed this

Twenty-eighth Day of October, 2008

JON W. DUDAS
*Director of the United States Patent and Trademark Office*